April 13, 1965    O. E. POTTER    3,177,961
SUSPENSION SYSTEM FOR TRACK TYPE VEHICLES
Filed Aug. 8, 1963    4 Sheets-Sheet 1

OLIN E. POTTER
INVENTOR.

BY Daniel H. Bobis
atty

April 13, 1965  O. E. POTTER  3,177,961
SUSPENSION SYSTEM FOR TRACK TYPE VEHICLES
Filed Aug. 8, 1963  4 Sheets-Sheet 2
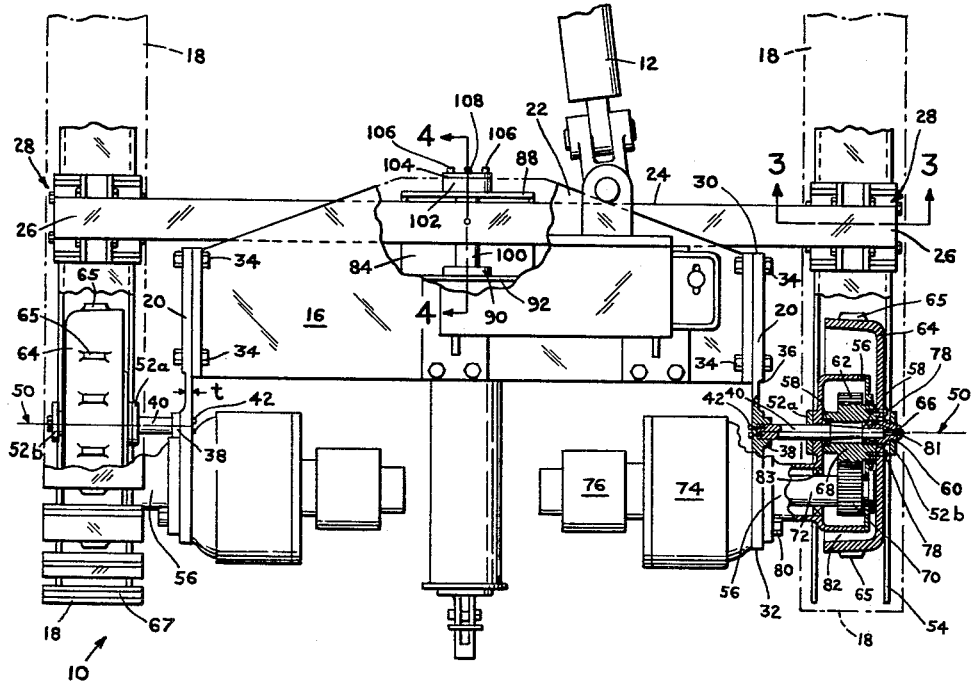
FIG. 2
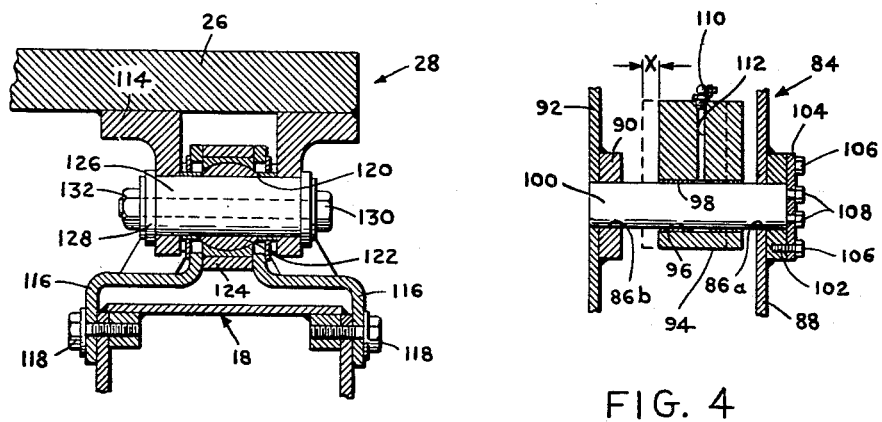
FIG. 3
FIG. 4
OLIN E. POTTER
INVENTOR.
BY Daniel H. Bobis
atty April 13, 1965   O. E. POTTER   3,177,961
SUSPENSION SYSTEM FOR TRACK TYPE VEHICLES
Filed Aug. 8, 1963   4 Sheets-Sheet 3

OLIN E. POTTER
INVENTOR.

BY Daniel H. Bobis
atty

April 13, 1965     O. E. POTTER     3,177,961
SUSPENSION SYSTEM FOR TRACK TYPE VEHICLES
Filed Aug. 8, 1963     4 Sheets-Sheet 4

OLIN E. POTTER
INVENTOR.
BY Daniel H. Bobis
Atty

United States Patent Office 3,177,961
Patented Apr. 13, 1965

3,177,961
SUSPENSION SYSTEM FOR TRACK
TYPE VEHICLES
Olin E. Potter, Wilbraham, Mass., assignor to Worthington
Corporation, Harrison, N.J., a corporation of Delaware
Filed Aug. 8, 1963, Ser. No. 300,794
6 Claims. (Cl. 180—9.5)

This invention relates to track type vehicles. More particularly this invention relates to suspension systems for track type vehicles.

This application is a continuation-in-part of my earlier application Serial No. 84,835 filed January 25, 1961, now abandoned, and my co-pending application Serial No. 153,256, filed November 15, 1961, now abandoned.

Heretofore, suspension systems have utilized bifurcated under carriage elements, plate members rigidly connected between the endless track laying mechanism and the chassis to control chassis rotation, and walking beams to support the front end of the chassis and to co-act with the bifurcated under carriage elements and the plate members to maintain the exact track parallelism. Such suspension systems provided very limited oscillation, were cumbersome and resulted in less than maximum trackability of the vehicle in unimproved and steep terrain.

An object of the present invention is to overcome these prior art difficulties and to provide an improved suspension system; which increases the track to ground contact by means of larger accommodation thus improving tractive effort; which allows track toe-in by means of a non-wearing joint. It was found that exact track parallelism is neither necessary nor practical and that the effect of track toe-in on track steering is negligible; which permits the endless track laying mechanisms to oscillate in opposite directions from one another relative the chassis to the extent required for conformance to ground irregularities and chassis stability; which fixes the center of oscillation about which each endless track laying mechanism will oscillate.

Another object of this invention is to provide an improved suspension system for a vehicle which must be suitably stable over a wide range of operable conditions. One typical example of a vehicle requiring the use of the improved suspension system is a vehicle carrying a drilling rig which has to move over underdeveloped land. In such a vehicle a maximum degree of stability in a normally horizontal plane is essential especially since the addition of the drilling rig will tend to make the vehicle prone to tipping.

Another object of this invention is to provide an improved suspension system having load bearing plate members to suitably connect the chassis and each of the endless track laying mechanisms on either side thereof; which plate members constitute non-wearing joints and suitably flex to absorb any bending moments from either of the endless track laying mechanisms during oscillation thereof and support lateral steering forces as well as vertical forces resulting from the weight of the chassis and drilling rig.

Another object of this invention is to provide an improved suspension system in which the walking beam is suitably connected to the chassis for pivotal and slidable movement; which walking beam has its end support vertical loading, lateral loading and further described a rearwardly arcuate path on oscillation of the endless track laying mechanisms; which walking beams can slide rearwardly at its chassis connection on oscillation of the endless track laying mechanisms about its center of oscillation to permit its ends to describe said rearwardly arcuate path.

Still another object of this invention is to provide an improved suspension system having co-action between the plate members and walking beams whereby any vertical and resulting limited horizontal movement of either endless track laying mechanism is distributed or absorbed so that the stability of the chassis is maintained over a wide range of operative conditions.

Other objects and advantages will be apparent of the following description of one embodiment of the invention and novel features will be particularly pointed out hereinafter in the claims.

In the drawings:

FIGURE 2 is a top plan view partly in section of the improved suspension system.

FIGURE 3 is a sectional view taken along line 3—3 of FIGURE 2.

FIGURE 4 is a sectional view taken along line 4—4 of FIGURE 2.

Figure 1:
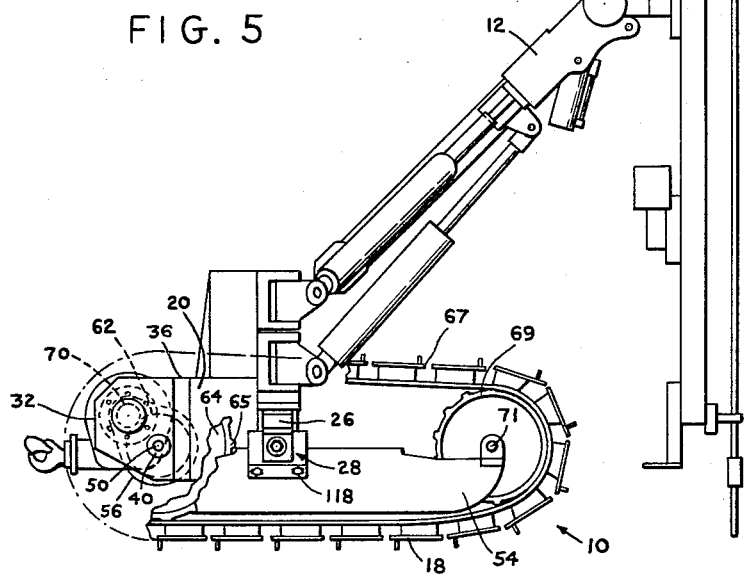
FIGURE 1 is a side elevation partly in section of a drill rig vehicle embodying the improved suspension system.

In the embodiment of the invention for improving suspension system shown in the drawings FIGURE 1 illustrates one typical type vehicle 10 on which is mounted a drill rig designated generally as 12. The drill rig 12 merely serves to show one possible use of vehicle 10 and since it is well known in the art and does not form part of the present invention it will not be described herein.

Track type vehicle 10 is symmetrical about its center line and therefore in describing various components thereof those on one side of the central line will be understood to have the same character reference as those on the other side.

Track type vehicle 10 as illustrated in FIGURES 1 and 2 has a chassis 16 disposed transversely between endless track laying mechanism 18 and is connected thereto by a pair of plate members 20 which are disposed in longitudinal relationship with the endless track laying mechanism 18. The special characteristics of these plate members are that they be thin and flexible about a vertical axis and have a high section modulus in a vertical plane.

At the forward end 22 of the chassis 16 walking beam 24 is pivotally and slidably connected thereto as more fully described hereinafter. The walking beam 24 has one of its ends 26 connected to each of the endless track laying mechanisms 18 as indicated generally at 28.

The plate member 20 as shown in FIGURE 2 has a forward end 30 and rearward end 32. The forward end 30 is fixedly connected to the chassis 16 by bolts 34 or suitable attaching means. Middle portion 36 of the plate member 20 is designed for limited flexibility about the vertical axis as indicated generally at $t$ for reasons described hereinafter.

Figure 6:
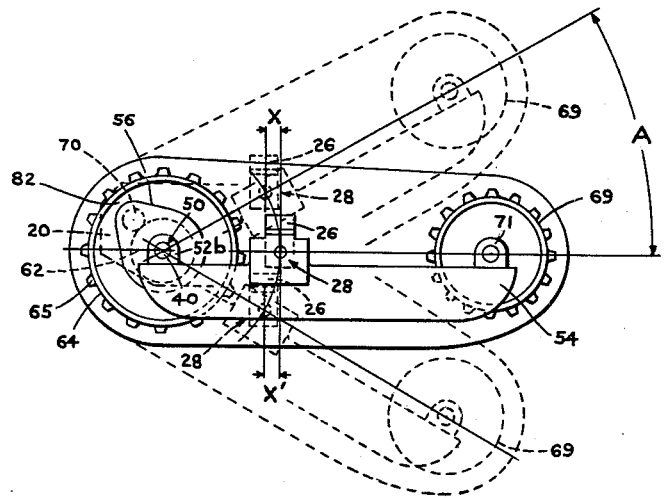
FIGURE 6 is a diagrammatic view of the side elevation showing the arcuate path of the end of the walking beam on oscillation of the endless track laying mechanism about the center of oscillation.
Figure 7:
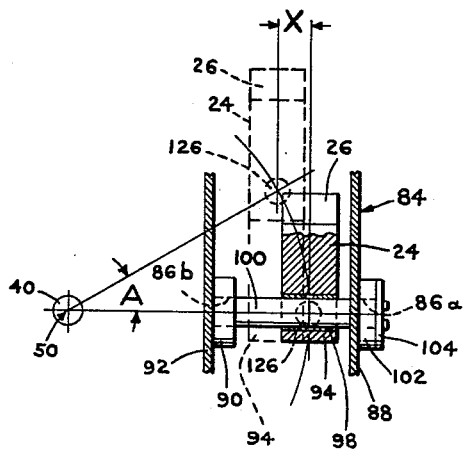
FIGURE 7 is a diagrammatic view of the side elevation showing the relative travel of the walking beam and the chassis connection and at one end thereof on oscillation of the endless track laying mechanism about its center of oscillation.

Also plate member 20 serves as an attaching means for the track motive power and suitably resists the reactive torque of propulsion. The gear reducer 74 and motor 76 as a unit, are connected on the inboard side of the plate member 20 by common bolts 80 with the drive housing 56 connected on the outboard side thereof. Many well known techniques may be used to connect the propulsion motors to the endless track laying mechanism with the one being shown for illustration purposes of the gear and pinion type wherein the stationary axis of the main drive sprocket or "Bull" gear 64 forms the center of track oscillation 50 as illustrated in FIGURES 2, 6 and 7.

In general operation, then as the one track laying mechanism should encounter ground irregularities it would oscillate about center of oscillation 50 carrying and being handled in spacial relationship to frame 16 by walking beam 24 through the arcuate paths shown in FIGURES 7 and 8 and described hereinafter. The center of chassis member 16 located adjacent pin 100 is raised by only one-half the amount beam end 26 is displaced. Thus chassis 16 can maintain a stable position over very rough terrain.

For the illustrated propulsion means the center of track oscillation 50 is formed on a line corresponding to the axis of stationary shaft 40. Stationary shaft 40 is fixedly connected in hub 38 of plate member 20 as by threaded means 42 and extends outwardly therefrom to pass through drive housing 56 positioned within endless track laying mechanism 18. As shown in FIGURES 2 and 6 shaft 40, drive gear 62, drive housing 56 and endless by brackets 52a and 52b fixedly disposed on either side of track doghouse 54. Stationary shaft 40 has bearing means 58 disposed thereon inwardly of mounting member 60 and nut 66. Nut 66 engages the threaded end section of shaft 40 to maintain the assembled position of the shaft 40, drive gear 62, drive housing 56 and endless track laying mechanism 18. Drive gear 62 is rotatably mounted on bearing means 58 and is engaged by pinion gear 70. Drive gear 62 has a thickened hub section 68 into which is disposed a plurality of studs 78 the other end of which threadedly join the drive sprocket 64 thereto so that the drive gear 62 and drive sprocket 64 are fixedly connected to each other. A seal means 81 is disposed between the hub section 68 of drive gear 62 and the drive housing 56 to prevent lubricant leakage from or dirt and foreign matter entering into the drive housing 56. Thus it is apparent that when the drive gear 62 is rotatably activated its rotatable motion is transmitted to drive sprocket 64 which in turn will supply the motive power for the endless track laying mechanisms 18. As shown in FIGURES 1 and 6 drive sprocket 64 has a plurality of teeth 65 which drivingly engage endless track 67. At the other end of track doghouse 54 a driven sprocket 69 is suitably mounted thereon as by mounting 71. Since the mechanism and operation of endless track laying mechanisms are well known in the art the above description need not be described in greater detail. Drive gear 62 is activated by a pinion gear 70 connected to power shaft 72. The other end of shaft 72 connects into gear reducer 74 which in turn receives its motive power from motor 76, as described hereinbefore. Power shaft 72 is suitably rotatably disposed in drive housing 56 as by means of bearing means 83.

The oscillation of the endless track laying mechanism 18 about its axis of oscillation 50 is unhampered by drive housing 56 or the various components therein. This is so for the following reasons:

(1) The spatial relationship between the axis of shafts 40 and 72 is a predetermined fixed distance so that this relationship is not subject to change within drive housing 56, whether or not endless track laying mechanism 18 oscillates about its axis of oscillation 50.

(2) The rotation of drive sprocket 64 is about the axis of oscillation 50, a fixed point with respect to chassis 16 and plate member 20. Therefore the clearance between drive housing 56 and drive sprocket 64 will always be equal to the distance represented by space 82, as shown in FIGURES 2 and 6, since the drive housing 56 is fixedly connected to plate member 20. Because there is an initial clearance, namely space 82, this clearance will remain regardless of any subsequent movement of the endless track laying mechanism 18 or drive sprocket 64, on oscillation of endless track laying mechanism 18 about axis of oscillation 50 the load will be distributed by the walking beam 24 and the plate 20 which are designed to absorb the flex or bending movements created when the walking beam 24 movement tends to cause the endless track laying mechanism 18 to toe-in as more fully described hereinafter. Thus the chassis 16 can maintain a balanced position over very rough terrain.

Figure 5:
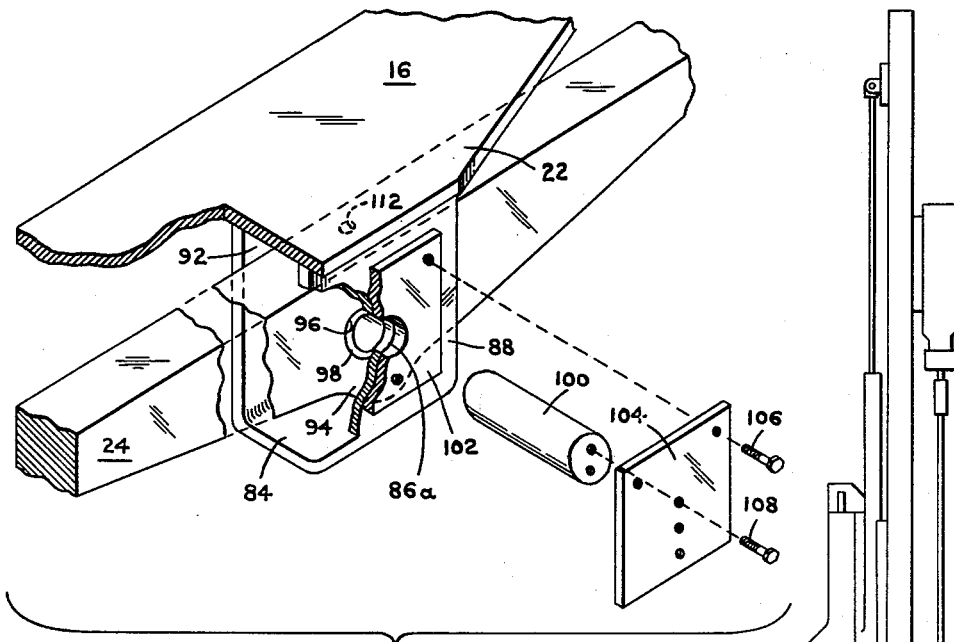
FIGURE 5 is partially exploded view showing the pivotal and slideable connection between the walking beam and chassis.

The chassis 16 as illustrated in FIGURES 2, 4 and 5 has a U-shaped member 84 connected under the forward end 22 thereof. Member 84 has a bore 96 in its front face 88 in line with a bore 86b in a hub 90 connected to its rear face 92. The walking beam 24 has a semi-circular middle undersection 94 which is disposed in the member 84 and has a bore 96 of larger diameter and in alignment with bore 86a and 86b so that when bushing 98 is disposed in bore 96 the inner diameter of bushing 98 will be slightly larger than that of bores 86a and 86b. A pin 100 having an outer diameter substantially equal to the diameter of bores 86a and 86b is operatively disposed into the bores 86a, 96 and 86b. Because of the difference in diameters of the pin 100 and the bushing 98 there is sufficient clearance between to allow walking bear 24 to move pivotally about the axis of pin 100 while being freed to slidably move thereon within the limits of the spacial distance between front space 88 and rear face 92 of U-shaped member 84 for purposes more fully described hereinafter. Front face 88 has a reinforcing plate 102 connected to a cover plate 104 as by bolts 106. Bolts 108 extend through upper plate 104 to the pin 100 to complete the assembling position of the walking beam 24 to the U-shaped member 84 of chassis 16. To prevent excessive wear of bushing 98 and pin 100 walking beam 24 is provided with a grease fitting 110 atop a transverse hole 112 in walking beam 24 and bushing 98. Further the axis of pin 100 lies in the same initially horizontal plane and in perpendicular relationship with the axis of oscillation 50 and the pin 126 of connection 28 so that all the respective centers are common in the neutral unoscillated position and on displacement of one endless track laying mechanism 18 an equal displacement will be produced in the other endless track laying mechanism 18.

The end 26 of walking beam 24 is connected at 28 to the track doghouse 54 of endless track laying mechanism 18 by any means capable of permitting limited rotation about an axis while transmitting thrust and any plane. A ball joint arrangement as shown in FIGURE 3 is typical of a satisfactory attachment. Accordingly the end 26 of the walking beam 24 is connected at 28 to the endless laying track mechanism 18 as shown in FIGURES 2 and 3. A clevis 114 is connected by welding to the underside of the end 26 of the walking beam 24. Abutment members 116 are connected to track doghouse 54 of the endless track laying mechanism 18 as by bolt 118 and are disposed on the inner side of the legs of clevis 114. Members 116 have a bore 120 therein in alignment with the bore in the clevis 114. A universal ball bushing 122 having a spacer or retainer 124 therewith is disposed between members 116 in alignment with the bore 120. A pin 126 is disposed in the bore 120. A washer 128 having a larger outer diameter is disposed on either side of the clevis 114 in alignment with the bore therethrough. The bolt 130 is passed through the both washers 128 and engages a nut 132 to maintain the parts in an assembled position. Thus the fixed length of the walking beam 24 will maintain the transverse spacial relationship of the endless track laying mechanisms 18. Also the above described connection 28 can accommodate both lateral thrust and vertical load transmitted to the walking beam 24 from the forward end 22 to the chassis 16 as more fully set forth hereinafter.

Referring first to the movement of the connection 28, any unevenness of the ground will cause the endless track mechanism 18 to be displaced vertically accordingly thereto or in other words the endless track mechanism will be caused to oscillate about the axis of oscillation 50. However, as shown in FIGURE 6 any oscillation of the endless track mechanism 18 whether up or down from its horizontal plane position will cause the walking beam 24 which is pivotally and slidably connected to the chassis 16 to move in a rearwardly describing arcuate path. End 26 of walking beam 24 will substantially maintain the same position it assumes when the endless track laying mechanism 18 is in a horizontal plane, i.e., a substantially perpendicular relationship to the horizontal plane. This merely results in end 26 rotating at connection 28 either forwardly or rearwardly in relation with the initial horizontal position of track laying mechanism 18. Further on oscillation of endless track laying mechanism 18 through an angle A the relative axial position of end 26 will be changed to a more rearwardly one with respect to its initial horizontal position as indicated at X and X' respectively, which distance is measured from the central line of end 26 and its initial horizontal position to the center line of end 26 and its new position rearwardly thereof on oscillation of endless track laying mechanism 18 about its axis of oscillation 50. Simultaneously a second geometric condition occurs, as shown in FIGURE 8, on endless track laying mechanisms 18 oscillation, the beam 24 describes an arc through angle B in a plane perpendicular to the plane shown in FIGURE 6 in which angle A lies. Such an arc through angle B causes a foreshortening of the transverse space between endless track laying mechanism 18 by the amount Y at each connection 28. This results as shown in FIGURE 9, in track toe-in since the transverse space distance between endless track laying mechanisms 18 at its center of oscillation 50 is a substantially fixed distance, being established by the chassis 40 connection to plate members 20 which in turn are connected to chassis 16. Both geometric conditions, it is seen, are dependent upon track oscillation angle A, as illustrated in FIGURE 6. Thus both vertical and limited horizontal track movement is accommodated by the universal action afforded at connection 28 by the pin 126 and ball bushing 122 respectively.

To prevent binding or bending of the walking beam 24 at its connection with the U-shaped member 84 of chassis 16, the walking beam 24 is permitted to slide rearwardly, as illustrated in FIGURE 7, on oscillation of the endless track laying mechanism 18. For clarity, only the position corresponding to the vertically upward oscillation of endless track laying mechanism 18 is depicted. However it is understood that equal but opposite displacement of endless track laying mechanism 18 results in equal rearward travel of both beam ends 26. Therefore no binding or misalignment of beam 24 with pin 100 will occur. The rearward movement of end 26 is represented by the distance X as was described hereinbefore under FIGURE 6. This rearward movement of end 26 corresponds to the rearward movement of walking beam 24 along pin 100. Thus the endless track laying mechanism 18 is free to oscillate through the cooperative movement of walking beam 24.

Simultaneously to the movement of the walking beam 24 the plate member 20 will flex a limited horizontal amount. This flexure about the vertical axis of slot 36 is produced by the lateral foreshortening action caused by walking beam 24 as illustrated in FIGURE 8 and described hereinbefore, which foreshortening occurs during the vertical displacement of the endless track laying mechanism 18 about the axis of oscillation 50 and is introduced to the plate member 20 through the rearward end 32 thereof. Substantially all of the bending moment is absorbed by the plate member 20 with the middle portion 36 serving to limit the bending stress to that below the yield strength of the material selected. It is understood that many design techniques for limiting strain may be effectively suitable to this application other than the particular one described.

Referring to the limited horizontal flexure of the plate member 20 which accommodates the toe-in of endless track laying mechanism 18 the plate member 20 is capable of transmitting substantial horizontal and torsional forces so that the integrity of the vehicle, including chassis 16, is maintained.

Figure 8:
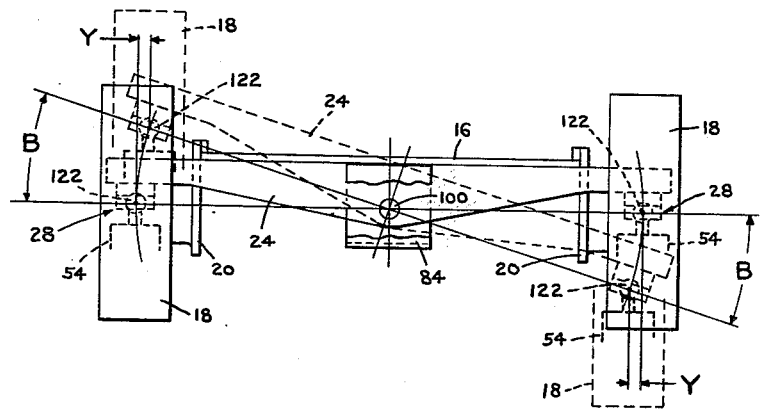
FIGURE 8 is a diagrammatic view of the front elevation showing the relative travel of the walking beam at the chassis connections on oscillation of the endless track laying mechanism about its center of oscillation in the plane perpendicular to the plane shown in FIGURES 6 and 7.
Figure 9:
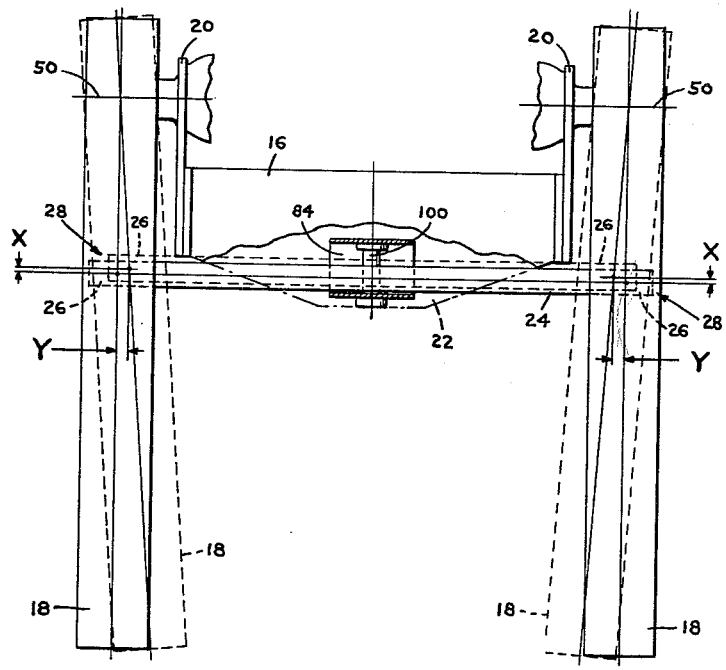
FIGURE 9 is a diagrammatic top plan view of the respective track toe-in resulting from the oscillation of the endless track laying mechanism about its center of oscillation.

As illustrated in FIGURE 8 the chassis member 16 is not inclined during oscillation of endless track laying mechanism 18 and it is apparent from FIGURE 6 that the chassis 16 will have an inclination that is substantially only one-half of the vertical excursion of the walking beam end 26.

It will be understood that various changes in the details, material and arrangement of parts which have been herein described and illustrated in order to explain the nature of the invention may be made by those skilled in the art within the principle and scope of the invention as expressed in the claims.

What is claimed is:

1. A suspension system for a track type vehicle having a chassis transversely disposed between a pair of endless track laying mechanisms comprising:
    (a) a walking beam connected at its ends to each of the endless track laying mechanisms by means which permit limited rotation of the endless track laying mechanism about the ends of said walking beam,
    (b) the walking beam intermediate its ends pivotally and slidably connected to the chassis, so that the walking beam is restrained in the horizontal plane and thus is always perpendicular to the line of travel of the track type vehicle,
    (c) a plate member connected to each side of the chassis,
    (d) means operatively connecting the plate member and the endless track laying mechanisms to define an axis of oscillation for the endless track laying mechanisms,
    (e) the walking beam and the plate members to coact on oscillation of the endless track laying mechanism to distribute the forces and movement caused by the oscillation thereby stabilizing the chassis,
    (f) each of the endless track laying mechanisms to toe-in a limited amount responsive to the foreshortened transverse distance therebetween caused by the pivoting of the walking beam whereby vertical and horizontal load is distributed throughout said track type vehicle,
    (g) the plate members to flex responsive to toe-in of the endless track laying mechanisms thereby compensating for the forces and moments acting thereon to stabilize the chassis.

2. The combination claimed in claim 1 wherein the endless track laying mechanisms have the ends of the walking beam and the plate members connected thereto on the rearward half thereof.

3. The combination claimed in claim 1 wherein:
    (a) each plate member is disposed transversely between the chassis and the endless track laying mechanisms,
    (b) each plate member is fixedly connected at one end thereof to the chassis,
    (c) the oscillation means includes a shaft fixedly connected to each plate member intermediate the ends thereof, and
    (d) the shaft operatively connected with the endless track laying mechanism and to define the axis of oscillation thereof.

4. The combination claimed in claim 1 wherein:
    (a) the ends of the walking beam and the axis of oscillation are in fixed spatial relationship to each other, (b) the ends of the walking beam to pivot at its chassis connection and to move in a rearwardly arcuate path about the axis of oscillation of the endless track laying mechanism on oscillation of the endless track laying mechanism responsive the track type vehicle traversing non-horizontal terrain, (c) each of the endless track laying mechanisms to toe-in a limited amount responsive to the foreshortened transverse distance therebetween caused by the pivoting of the walking beam whereby vertical and horizontal load is distributed throughout said track type vehicle, (d) the plate member to flex responsive to toe-in of the endless track laying mechanisms thereby compensating for the forces and moments acting thereon to stabilize the chassis.

5. A suspension system for a track type vehicle having a chassis transversely disposed between a pair of endless track laying mechanisms comprising:

(a) a plate member connected to each side of the chassis, (b) a shaft fixedly connected to each plate member intermediate the ends thereof, (c) the shaft in operative connection with the endless track laying mechanism and to define the axis of oscillation thereof, (d) motive means connected to the other end of each plate member, (e) a drive gear supported by and rotatably mounted on the shaft to drive the endless track laying mechanisms, (f) motive means adapted to engage and drive the drive gear, (g) a walking beam transversely disposed between the pair of endless track laying mechanisms, (h) means of connecting each end of the walking beam and the endless track laying mechanisms adjacent thereto to universally engage the end of the walking beam and said endless track laying mechanisms, (i) pin means loosely disposed through the walking beam intermediate its ends to pivotally and slidably connect the walking beam to the chassis whereby on oscillation of the endless track laying mechanisms the walking beam to permit said oscillation by slidably moving rearwardly on the pin means, by pivoting about said pin means in the transverse plane of its disposition and by having its ends move in a rearwardly arcuate path about the center of oscillation whereby the endless track laying mechanisms can toe-in a limited amount.

6. A suspension system for a track type vehicle having a chassis transversely disposed between a pair of endless track laying mechanisms comprising:

(a) plate members connecting the chassis and the endless track laying mechanisms, (b) the plate members being thin and flexible about a vertical axis and having a high section modulus in the vertical plane so as to absorb bending movements created by the toe-in of the track laying mechanisms, (c) the plate members adapted to support lateral as well as vertical forces, (d) a shaft fixedly connected to each plate member at the rearward part thereof, (e) the shaft in operative connection with the endless track mechanism to define the axis of oscillation of the track mechanism, (f) a walking beam transversely located between the pair of endless track laying mechanisms, (g) pin means connected to the chassis by which the walking beam is pivotally and slidably connected to the chassis, (h) the walking beam pivoting on and sliding rearwardly along the pin means toward the axis of oscillation of the track laying mechanism upon oscillation of the walking beam ends and the endless track mechanism caused by traversing non-horizontal terrain, (i) the walking beam ends connected to the track laying mechanisms by universal means which permit limited rotation of the endless track laying mechanism about the ends of said walking beam, (j) the walking beam and the plate members to coact on oscillation of the endless track laying mechanisms and to distribute any vertical and limited horizontal movement of either endless track laying mechanism.

References Cited by the Examiner
UNITED STATES PATENTS

| 1,934,670 | 11/33 | Hickman | 280—104.5 |
| 2,786,724 | 3/57 | Armington et al. | 180—9.5 X |
| 2,828,137 | 3/58 | Wagner | 180—9.5 |
| 2,988,159 | 6/61 | Weber | 180—9.5 |

PHILIP ARNOLD, Primary Examiner.

A. HARRY LEVY, Examiner.